(12) United States Patent
Xia et al.

(10) Patent No.: US 10,791,030 B2
(45) Date of Patent: Sep. 29, 2020

(54) POLICY TRANSMISSION METHOD AND APPARATUS IN NFV SYSTEM

(71) Applicant: Huawei Technologies Co., Ltd., Shenzhen, Guangdong (CN)

(72) Inventors: Haitao Xia, Beijing (CN); Fang Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 16/054,267

(22) Filed: Aug. 3, 2018

(65) Prior Publication Data
US 2018/0375734 A1    Dec. 27, 2018

Related U.S. Application Data

(63) Continuation of application No. PCT/CN2016/073730, filed on Feb. 6, 2016.

(51) Int. Cl.
| | | |
|---|---|---|
| *G06F 15/173* | (2006.01) | |
| *H04L 12/24* | (2006.01) | |
| *G06F 9/50* | (2006.01) | |
| *G06F 9/455* | (2018.01) | |

(52) U.S. Cl.
CPC ...... *H04L 41/0893* (2013.01); *G06F 9/45558* (2013.01); *G06F 9/5077* (2013.01); *H04L 41/0246* (2013.01); *H04L 41/0206* (2013.01); *H04L 41/22* (2013.01); *H04L 41/50* (2013.01)

(58) Field of Classification Search
CPC ............. H04L 41/0893; H04L 41/0246; H04L 41/0206; H04L 41/22; H04L 41/50; G06F 9/45558; G06F 9/5077
See application file for complete search history.

(56) References Cited

U.S. PATENT DOCUMENTS

2009/0319480 A1* 12/2009 Saito ................... G06F 21/6218
2015/0358248 A1   12/2015 Saha et al.
(Continued)

FOREIGN PATENT DOCUMENTS

| CN | 1988478 A | 6/2007 |
|---|---|---|
| CN | 101026552 A | 8/2007 |

(Continued)

OTHER PUBLICATIONS

Huawei, "Feature proposal on policy management in MANO," ETSE, NFV(15)FTR0007, Sep. 7, 2015, 5 pages. XP014250436.
(Continued)

*Primary Examiner* — Sm A Rahman
(74) *Attorney, Agent, or Firm* — Fish & Richardson P.C.

(57) ABSTRACT

Embodiments of the disclosure disclose a policy transmission method and apparatus in an NFV system. The method may include: obtaining, by a PMF unit, policy information, where the policy information includes a policy rule and a first policy parameter, and the first policy parameter is used to determine a target management unit for the policy rule in a MANO architecture of the NFV system; and transmitting, by the PMF unit, the policy rule to the target management unit based on the first policy parameter. According to the embodiments of the disclosure, an NFVO can be prevented from becoming a policy rule processing bottleneck.

20 Claims, 6 Drawing Sheets

(56) References Cited

U.S. PATENT DOCUMENTS

| | | | |
|---|---|---|---|
| 2016/0112261 A1* | 4/2016 | Amato | H04L 63/306 709/220 |
| 2016/0212648 A1* | 7/2016 | Xu | H04L 12/1435 |
| 2017/0222889 A1 | 8/2017 | Zong et al. | |
| 2018/0024852 A1* | 1/2018 | Yabushita | G06F 9/45558 718/1 |

FOREIGN PATENT DOCUMENTS

| | | | |
|---|---|---|---|
| CN | 101079779 A | * | 11/2007 |
| CN | 101079779 A | | 11/2007 |
| CN | 102857416 A | | 1/2013 |
| CN | 105282195 A | | 1/2016 |
| WO | 2015082013 A1 | | 6/2015 |
| WO | 2015168834 A1 | | 11/2015 |
| WO | 2015191965 A2 | | 12/2015 |
| WO | 2015196733 A1 | | 12/2015 |
| WO | 2015197025 A1 | | 12/2015 |

OTHER PUBLICATIONS

Office Action issued in Chinese Application No. 201680080641.X dated Nov. 27, 2019, 15 pages (with English translation).
Examination Report issued in Indian Application No. 201817030372 dated Jun. 24, 2020, 6 pages.
Office Action issued in Chinese Application No. 201680080641.X dated Aug. 19, 2020, 9 pages.

* cited by examiner

POLICY TRANSMISSION METHOD AND APPARATUS IN NFV SYSTEM

CROSS-REFERENCE TO RELATED APPLICATIONS

This application is a continuation of International Patent Application No. PCT/CN2016/073730 filed on Feb. 6, 2016, The disclosure of the aforementioned application is hereby incorporated by reference in the entity.

TECHNICAL FIELD

The disclosure relates to the communications field, and in particular, to a policy transmission method and apparatus in an NFV system.

BACKGROUND

Network Functions Visualization (NFV) is a visualization technology and implements some telecommunications network functions in a server, a switch, and a storage apparatus, thereby implementing fast and efficiency network service deployment, and achieving a network operating objective of reducing a capital expense (CAPEX) and an operating expense (OPEX). Currently, NFV standardization in the industry mainly focuses on dynamic MANO of a virtualized network function and resources. An existing management and orchestration (MANO) architecture includes the following management entities: a network functions virtualization orchestrator (FVO), a virtualized network function manager (VNFM), and a virtualized infrastructure manager (VIM).

The NFVO can be used to manage and process a network service descriptor (NSD) and a virtualized network function forwarding graph (VNFFG), and further used to manage a network service life cycle. The NFVO can further cooperate with the VNFM to manage a virtualized network function (VNF) life cycle and implement a global view function for resources.

The VNFM can be used for virtualized network function VNF life cycle management, which may specifically include managing and processing a virtualized network function descriptor (VNFD), initializing a VNF instance, VNF scale-out and scale-in (that is, flexible scaling), and terminating a VNF instance. In addition, the VNFM can further receive a flexible scaling policy delivered by the NFVO, and implement automatic flexible scaling of the VNF.

The VIM can be responsible for managing infrastructure layer hardware resources and virtual resources, monitoring and reporting failures, and providing a virtual resource pool for an upper-layer application.

In most cases, the three management entities implement the management and processing by executing some policy rules. However, a policy rule in the existing MANO architecture is first input to the NFVO by using an operations support system (OSS) or a business support system (BSS). The NFVO further determines whether to locally execute the policy rule or deliver the policy rule to the VNFM or the VIM. In addition, as a centralized manager in a MANO management domain, the NFVO determines a corresponding policy rule for managing the VNF life cycle and managing virtual resources in the domain. Currently, the NFVO becomes a policy rule processing bottleneck.

SUMMARY

Embodiments of the disclosure provide a policy transmission method and apparatus in an NFV system to prevent an NFVO from becoming a policy rule processing bottleneck.

According to a first aspect, an embodiment of the disclosure provides a policy transmission method in an NFV system, including:

obtaining, by a policy management function (PMF) unit, policy information, where the policy information includes a policy rule and a first policy parameter, and the first policy parameter is used to determine a target management unit for the policy rule in a MANO architecture of the NFV system; and transmitting, by the PMF unit, the policy rule to the target management unit based on the first policy parameter.

In this implementation, the PMF unit is responsible for transmitting the policy rule in the MANO architecture. This can reduce load of an NFVO in the MANO architecture, thereby preventing the NFVO from becoming a policy rule processing bottleneck.

In a first possible implementation of the first aspect, the target management unit may include at least one of the following:

an NFVO, a VNFM, and a VIM.

With reference to the first aspect or the first possible implementation of the first aspect, the first policy parameter includes type information of a MANO function, and the target management unit includes a management unit for implementing the MANO function; and the transmitting, by the PMF unit, the policy rule to the target management unit based on the first policy parameter includes:

determining, by the PMF unit by using the type information, the management unit for implementing the MANO function in the MANO architecture, and transmitting the policy rule to the management unit for implementing the MANO function.

In this implementation, the management unit for implementing the MANO function is determined based on a function type identifier of the MANO function. Therefore, when generating the policy information, the NFV system does not need to sense information about the management unit for implementing the MANO function. This can reduce complexity of creating and maintaining a policy rule by the NFV system.

With reference to the second possible implementation of the first aspect, the type information of the MANO function includes at least one of the following:

virtualized network function life cycle management, network service life cycle management, network service healing, virtualized network function healing, and virtual resource management.

With reference to the first aspect or the first possible implementation of the first aspect, in a fourth possible implementation of the first aspect, the first policy parameter includes information about a policy execution unit for executing the policy rule, the information about the policy execution unit includes type information or identifier information of the policy execution unit, and the target management unit includes the policy execution unit for executing the policy rule; and the transmitting, by the PMF unit, the policy rule to the target management unit based on the first policy parameter includes:

when the information about the policy execution unit includes the type information of the policy execution unit, selecting, by the PMF unit, the policy execution unit from an execution management unit set in the MANO architecture, and sending the policy rule to the policy execution unit, where a management unit type of a management unit included in the execution management unit set is a management unit type indicated by the type information; or when the information about the policy execution unit includes the management unit identifier information of the policy execution unit, using, by the PMF unit, the identifier information to identify the policy execution unit, and sending the policy rule to the policy execution unit.

In this implementation, the policy execution unit can be determined based on the management unit information, thereby implementing efficient policy rule management and distribution.

With reference to the fourth possible implementation of the first aspect, in a fifth possible implementation of the first aspect, the type information of the policy execution unit includes:

NFVO information, VNFM information, or VIM information.

With reference to the first aspect or the first possible implementation of the first aspect, in a sixth possible implementation of the first aspect, the first policy parameter includes first management unit information of a policy execution unit for executing the policy rule and second management unit information of a policy forwarding unit, the first management unit information includes type information or identifier information of the policy execution unit, and the second management unit information includes type information or identifier information of the policy forwarding unit.

With reference to the sixth possible implementation of the first aspect, in a seventh possible implementation of the first aspect, the target management unit includes the policy forwarding unit; and the transmitting, by the PMF unit, the policy rule to the target management unit based on the first policy parameter includes:

when the second management unit information includes the type information of the policy forwarding unit, selecting, by the PMF unit, the policy forwarding unit from a management unit set in the MANO architecture, and sending the policy rule and the first management unit information to the policy forwarding unit, so that the policy forwarding unit uses the first management unit information to send the policy rule to the policy execution unit, where a management unit type of a management unit included in the policy forwarding unit set is a management unit type indicated by the type information included in the second management unit information; or sending, by the PMF unit, the policy rule and the first management unit information to the policy forwarding unit when the second management unit information includes the identifier information of the policy forwarding unit, so that the policy forwarding unit uses the first management unit information to send the policy rule to the policy execution unit.

In this implementation, the policy rule can be sent to the policy execution unit by the policy forwarding unit. Therefore, the PMF unit does not need to establish a connection with the policy execution unit. This can reduce overheads of the NFV system.

With reference to the seventh possible implementation of the first aspect, in an eighth possible implementation of the first aspect, the policy forwarding unit includes at least the NFVO, and the policy execution unit includes at least one of the following:

the VNFM and the VIM.

With reference to any one of the first aspect or the possible implementations of the first aspect, in a ninth possible implementation of the first aspect, the policy information further includes a second, policy parameter, the second policy parameter is used to indicate that the policy rule is an atomic policy rule, and the atomic policy rule is a policy rule that does not need to be further parsed when being executed; and the transmitting, by the PMF unit, the policy rule to the target management unit based on the first policy parameter includes:

transmitting, by the PMF unit, the atomic policy rule to the target management unit based on the first policy parameter.

With reference to any one of the first aspect to the eighth possible implementation of the first aspect, in a tenth possible implementation of the first aspect, the policy information further includes a second policy parameter, the second policy parameter is used to indicate that the policy rule is a composite policy rule, the composite policy rule includes at least two atomic policy rules, and the atomic policy rule is a policy rule that does not need to be further parsed when being executed;

the method further includes:

when the second policy parameter indicates that the policy rule is a composite policy rule, parsing, by the PMF unit, the policy rule to obtain the at least two atomic policy rules included in the policy rule; and the transmitting, by the PMF unit, the policy rule to the target management unit based on the first policy parameter includes:

transmitting, by the PMF unit based on the first policy parameter, the at least two atomic policy rules included in the policy rule to the target management unit.

In this implementation, the policy execution unit does not need to parse the transmitted atomic policy rule when executing the policy rule, and this can reduce power consumption of the policy execution unit. In addition, the policy execution unit may be deployed without a policy rule parsing capability, thereby reducing costs of the policy execution unit.

With reference to any one of the first aspect or the possible implementations of the first aspect, in an eleventh possible implementation of the first aspect, the obtaining, by a PMF unit, policy information includes:

receiving, by the PMF unit, a policy rule creation command transmitted by an OSS or a BSS, and using the policy rule creation command to create policy information; or receiving, by the PMF unit, policy information entered in a graphical user interface (GUI).

According to a second aspect, an embodiment, of the disclosure provides a PMF unit, the PMF unit is configured to implement functions of the method provided in the first aspect and is implemented by hardware/software, and the hardware/software includes units corresponding to the functions.

According to a third aspect, an embodiment of the disclosure provides a PMF unit, including: a processor, a network interface, a memory, and a communications bus. The communications bus is configured to implement connection and communication between the processor, the network interface, and the memory. The network interface may be configured to transmit a policy rule, and may be further configured to receive policy information. The processor executes a program stored in the memory to implement the method provided in the first aspect.

BRIEF DESCRIPTION OF DRAWINGS

To describe the technical solutions in the embodiments of the disclosure or in the prior art more clearly, the following briefly describes the accompanying drawings required for describing the embodiments or the prior art. Apparently, the accompanying drawings in the following description show merely some embodiments of the disclosure, and a person of ordinary skill in the art may still derive other drawings from these accompanying drawings without creative efforts.

DESCRIPTION OF EMBODIMENTS

Figure 1:
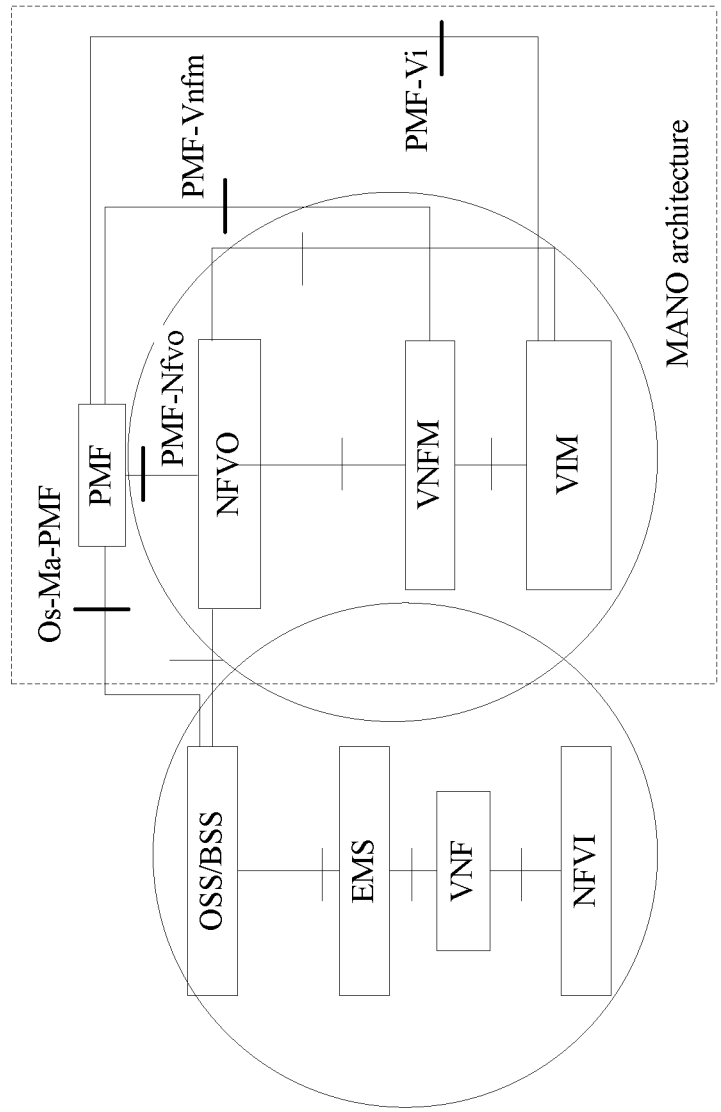
FIG. 1 is an architectural diagram of an NFV system according to an embodiment of the disclosure.

Referring to FIG. 1, FIG. 1 is an architectural diagram of an NFV system according to an embodiment of the disclosure. The NFV system shown in FIG. 1 includes: an OSS/BSS, an element management system (EMS), a virtualized network function (VNF), a network functions virtualization infrastructure (NFVI), and a MANO architecture. The MANO architecture includes: a PMF unit, an NFVO, a VNFM, and a VIM.

The OSS is a telecom operator's integrated support system for sharing information resources, and is mainly used for services such as network management, system management, billing, business operation, accounting, and a customer service. The BSS is also a telecom operator's integrated support system for sharing information resources, and is mainly used for services such as customer relationship management, service supply chain management, and business decision support. The EMS can be configured to execute a conventional fault management, configuration management, accounting management, performance management, and security management (FCAPS) function for the VNF. The VNF may be corresponding to a physical network function (PNF) in a conventional non-virtualized network. The NFVI includes hardware resources, virtual resources, and a virtualization layer.

In addition, the PMF unit is a new management unit in the MANO architecture in this embodiment of the disclosure. Optionally, the PMF unit may be a management unit. The PMF unit may be at a same layer as the NFVO in the MANO architecture. The PMF unit may be physically implemented as a separate manager. When the PMF unit is a separate manager, the PMF unit is separately connected to the OSS/BSS, the NFVO, the VNFM, and the VIM. Specifically, the PMF unit may be connected to the OSS/BSS, the NFVO, the VNFM, and the VIM by using policy management reference points, for example, connected to the OSS/BSS, the VNFM, the VIM, and the NFVO by using policy management reference points Os-Ma-PMF, PMF-Vnfm, PMF-Vi, and PMF-Nfvo, respectively. For details, refer to FIG. 1. In addition, in some embodiments, the PMF unit may be physically implemented as a manager co-located with the NFVO. Alternatively, it may be understood that the PMF unit and the NFVO are deployed in a same physical computer system. In this case, the PMF unit is separately connected to the VNFM and the VIM.

Figure 2:
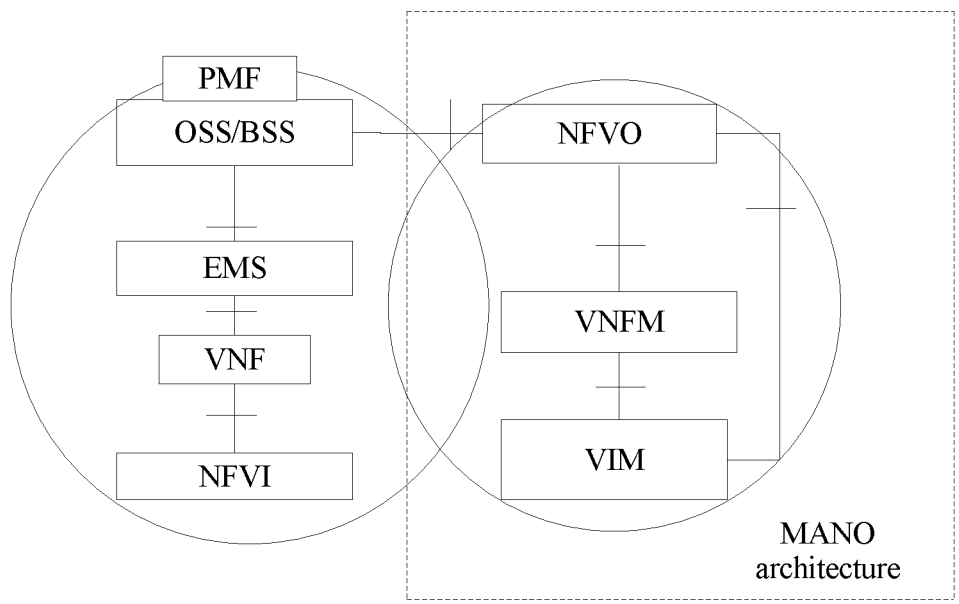
FIG. 2 is an architectural diagram of another NFV system according to an embodiment of the disclosure.

Certainly, FIG. 1 merely illustrates an embodiment in which the PMF unit is deployed in the MANO architecture. In some embodiments, the PMF unit may be deployed in the OSS or the BSS, as shown in FIG. 2. The PMF unit is in the OSS/BSS. For a function implemented by each management unit in the system, refer to the system architecture shown in FIG. 1. Details are not described herein again.

In addition, it should be noted that, in this embodiment of the disclosure, the NFVO, the VNFM, and the VIM in the MANO architecture may represent management units whose management unit types are NFVO, VNFM, and VIM, respectively. Moreover, the MANO architecture may include one or more management units whose management unit type is NFVO, one or more management units whose management unit type is VNFM, and one or more management units whose management unit type is VIM.

Figure 3:
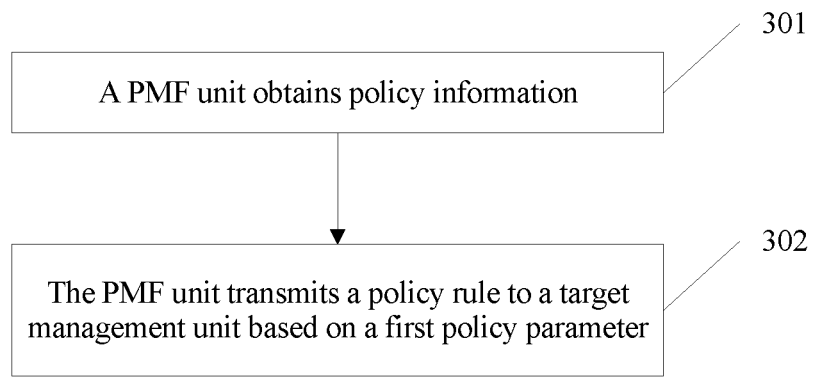
FIG. 3 is a schematic flowchart of a first policy transmission method in an NFV system according to an embodiment of the disclosure.

Referring to FIG. 3, FIG. 3 is a schematic flowchart of a first policy transmission method in an NFV system according to an embodiment of the disclosure. As shown in FIG. 3, the method includes the following steps.

301. A PMF unit obtains policy information, where the policy information includes a policy rule and a first policy parameter, and the first policy parameter is used to determine a target management unit for the policy rule in a MANO architecture of the NFV system.

In this embodiment, the policy rule may include at least one of a policy event, a policy condition, and a policy action. Optionally, the first policy parameter may be a policy type. The target management unit may be determined by using the policy type.

302. The PMF unit transmits the policy rule to the target management unit based on the first policy parameter.

In this embodiment, when obtaining the first policy parameter, the PMF unit can determine the target management unit in the MANO architecture, thereby transmitting the policy rule to the target management unit.

Optionally, the target management unit may be a policy execution unit for executing the policy rule, or a policy forwarding unit configured to forward the policy rule to the policy execution unit.

In addition, the target management unit may include at least one of an NFVO, a VNFM, and a VIM.

The NFVO, the VNFM, and the VIM may be policy execution units. For example, in the system shown in FIG. 1, the NFVO, the VNFM, and the VIM may all be policy execution units.

In addition, in some implementations, the NFVO may be a policy forwarding unit, and the VNFM and the VIM are policy execution units. For example, in the system shown in FIG. 2, when the VNFM or the VIM is a policy execution unit, the PMF unit can transmit the policy rule to the policy execution unit by using the NFVO.

Optionally, the first policy parameter may include type information of a MANO function. The target management unit includes a management unit for implementing the MANO function. The MANO function may be a management or healing function in the MANO architecture.

Optionally, in this implementation, step 302 may include:

determining, by the PMF unit by using the function type information, the management unit for implementing the MANO function in the MANO architecture, and transmitting the policy rule to the management unit for implementing the MANO function.

The management unit for implementing the MANO function may include the NFVO, the VNFM, or the VIM.

Because the first policy parameter includes the type information of the MANO function, the management unit for implementing the MANO function can be determined based on the type information of the MANO function. In this way, when generating the policy information, the NFV system does not need to sense information about the management unit for implementing the MANO function. For example, the NFV system does not need to sense type information or identifier information of the management unit for implementing the MANO function. This can reduce complexity of creating and maintaining a policy rule by the NFV system. For example, when the PMF unit receives the function type information of the MANO function from, an OSS/BSS, the OSS/BSS does not need to sense the type information or the identifier information of the management unit for implementing the MANO function. This reduces complexity of creating and maintaining a policy rule by the OSS/BSS.

Optionally, in this implementation, the PMF unit may determine, based on a pre-stored mapping relationship between type information of a MANO function and information about a MANO management unit, the management unit for implementing the MANO function. The information about the MANO management unit herein may be type information or identifier information. In addition, the management unit for implementing the MANO function may be further understood as a management unit executing the policy rule.

Optionally, the type information of the MANO function may be enumerated information. To be specific, this type of information can directly indicate the MANO function. For example, the type information of the MANO function may include at least one of the following:

virtualized network function life cycle management (VNF LCM), network service life cycle management (NS LCM), network service healing, virtualized network function healing (VNF healing), and virtual resource management.

Management units in the MANO architecture can implement respective MANO functions. For example, the VNFM can be configured to implement VNF LCM and virtualized network function healing, the NFVO can implement NS LCM and network service healing, and the VIM can implement virtual resource management.

Optionally, the first policy parameter may include information about the policy execution unit for executing the policy rule. The information about the policy execution unit includes type information or identifier information of the policy execution unit. The target management unit includes the policy execution unit for executing the policy rule.

Optionally, in this implementation, step 302 may include:

when the information about the policy execution unit includes the type information of the policy execution unit, selecting, by the PMF unit, the policy execution unit from an execution management unit set in the MANO architecture, and sending the policy rule to the policy execution unit, where a management unit type of a management unit included in the execution management unit set is a management unit type indicated by the type information; or when the information about the policy execution unit includes the identifier information of the policy execution unit, using, by the PMF unit, the management unit identifier information to identify the policy execution unit, and sending the policy rule to the policy execution unit.

In this implementation, the PMF unit may use all management units in the execution management unit set as the policy execution unit. Certainly, the PMF unit may alternatively select one or more management units from the execution management unit set as the policy execution unit. For example, when the type information of the management unit includes VIM, the PMF unit can send the policy rule to all or some VIMs in the MANO architecture.

In addition, the type information of the policy execution unit may be enumerated type information. For example, the type information of the policy execution unit may include:

NFVO information, VNFM information, or VIM information.

The NFVO information, the VNFM information, and the VIM information may indicate NFVO, VNFM, and VIM type information, respectively. In this way, the type information can be used to directly determine that a type of the policy execution unit is NFVO, VNFM, or VIM.

In addition, the identifier information may be a unique identifier of a management unit in MANO. For example, the MANO architecture may include a plurality of VIMs. In this case, a unique identifier may be preassigned to each VIM in the MANO architecture.

In this implementation, the policy execution unit can be determined based on the information about the policy execution unit, thereby implementing efficient policy rule management and distribution.

Optionally, the policy information may further include a second policy parameter. The second policy parameter is used to indicate that the policy rule is an atomic policy rule. The atomic policy rule is a policy rule that does not need to be further parsed when being executed.

Optionally, in this implementation, step 302 may include:

transmitting, by the PMF unit, the atomic policy rule to the target management unit based on the first policy parameter.

The atomic policy rule may be understood as a policy rule that can be directly executed without the need of being further parsed when the policy execution unit executes the policy rule.

In this implementation, the PMF unit can directly deliver the atomic policy rule to the target management unit.

Optionally, the policy information may further include a second policy parameter. The second policy parameter is used to indicate that the policy rule is a composite policy rule. The composite policy rule includes at least two atomic policy rules. The atomic policy rule is a policy rule that does not need to be further parsed when being executed.

The method may further include the following step:

when the second policy parameter indicates that the policy rule is a composite policy rule, parsing, by the PMF unit, the policy rule to obtain the at least two atomic policy rules included in the policy rule.

Step 302 may include:

transmitting, by the PMF unit based on the first policy parameter, the at least two atomic policy rules included in the policy rule to the target management unit.

In this implementation, the second policy parameter may be understood as a policy granularity. The composite policy rule may be understood as a policy rule that needs to be parsed for execution when the policy execution unit executes the policy rule.

For example, the policy rule is a VNF capacity change policy. The second policy parameter in the policy information indicates that the VNF capacity change policy is a composite policy rule. The VNF capacity change policy may include the following content:

monitor a VNF health index;

if (the VNF health index changes), change a deployment template (deployment flavor) bound with the VNF;

else if (a quantity of calls per second (Calls per second) is greater than a threshold 1), perform a VNF capacity scaling out (Scaling Out) operation whose step is a step 1; and else if (a quantity of calls per second (Calls per second) is less than or equal to a threshold 2), perform a VNF capacity scaling in (Scaling In) operation whose step is a step 2.

The VNF capacity change policy is determined by using a VNF application layer health index transmitted by an element manager EM and a virtual resource performance indicator, namely, the quantity of calls per second (Calls per second), monitored by the VNFM itself. In addition, a value range of the VNF health index (Health Indicator) may be {green (healthy), yellow (subhealthy), red (unhealthy)}.

Because the VNF capacity change policy is a composite policy rule, the PMF unit parses the policy rule to obtain at least two atomic policy rules included in the policy rule. To be specific, the PMF unit obtains the following atomic policy rules:

Atomic policy 1: If (the VNF health index changes), change the deployment template (deployment flavor) bound with the VNF.

Atomic policy 2: If (the VNF health index does not change) and (the quantity of calls per second is greater than the threshold 1), perform the VNF capacity scaling out operation whose step is the step 1.

Atomic policy 3: If (the VNF health index does not change) and (the quantity of calls per second is less than or equal to the threshold 2), perform the VNF capacity scaling in operation whose step is the step 2.

In this implementation, the policy execution unit does not need to parse the transmitted atomic policy rule when executing the policy rule, and this can simplify policy processing logic of the policy execution unit, thereby reducing policy execution costs for the policy execution unit.

In this embodiment, the PMF unit is responsible for transmitting the policy rule in the MANO architecture. This can reduce load of the NFVO in the MANO architecture, thereby preventing the NFVO from becoming a policy rule processing bottleneck.

Figure 4:
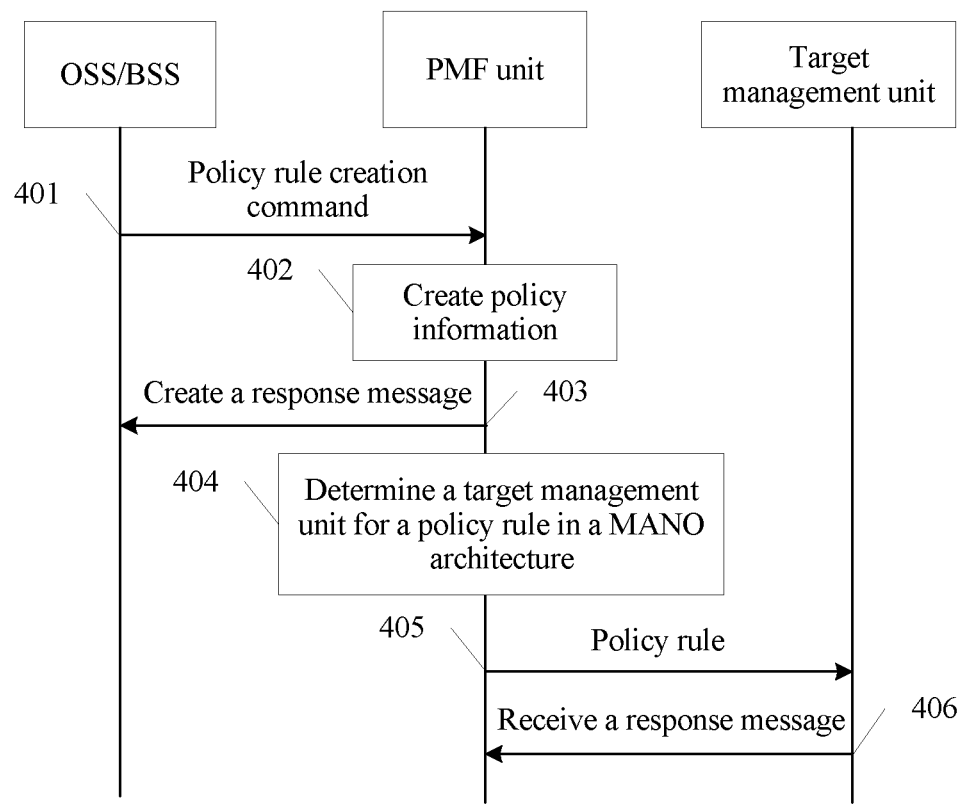
FIG. 4 is a schematic flowchart of a second policy transmission method in an NFV system, according to an embodiment of the disclosure.

Referring to FIG. 4, FIG. 4 is a schematic diagram of a second policy transmission method in an NFV system according to an embodiment of the disclosure. In this embodiment, for details of the same content as the method shown in FIG. 3, refer to the first policy transmission method in an NFV system. The details are not described herein again. As shown in FIG. 4, the method includes the following steps.

401. A PMF unit receives a policy rule creation command sent by an OSS or a BSS.

The policy rule creation command may carry information for generating a policy rule and a first policy parameter. For example, the policy rule creation command may carry information about a policy event, a policy condition, and a policy action. In this case, the PMF unit can use the information to generate the policy rule. For example, the policy rule creation command may carry the first policy parameter.

402. The PMF unit uses the policy rule creation command to create policy information.

The policy information includes the policy rule and the first policy parameter. The first policy parameter is used to determine a target management unit for the policy rule in a MANO architecture of the NFV system.

Certainly, step 401 and step 402 are replaceable. For example, in some implementations, the PMF unit may pre-store the information for generating the policy rule and the first policy parameter.

403. The PMF unit transmits a policy information creation response message to the OSS or the BSS.

Certainly, step 403 is optional. To be specific, in this embodiment, the PMF unit may not transmit a policy information creation response message to the OSS or the BSS when creating the policy information is complete.

404. The PMF unit uses the first policy parameter to determine a target management unit for the policy rule in the MANO architecture.

The target management unit may be a policy execution unit for executing the policy rule.

Certainly, step 404 is optional. To be specific, in this embodiment, the PMF unit may directly transmit the policy rule to the target management unit when creating the policy information is complete.

405. The PMF unit transmits the policy rule to the target management unit.

For an implementation of step 405, refer to step 302 in the embodiment shown in FIG. 3. Details are not described herein again.

406. The target management unit transmits a policy rule reception response message to the PMF unit.

According to this embodiment, an NFVO can be prevented from, becoming a policy rule processing bottleneck. In addition, the method described in this embodiment can be applied, to the system shown in FIG. 1.

Figure 5:
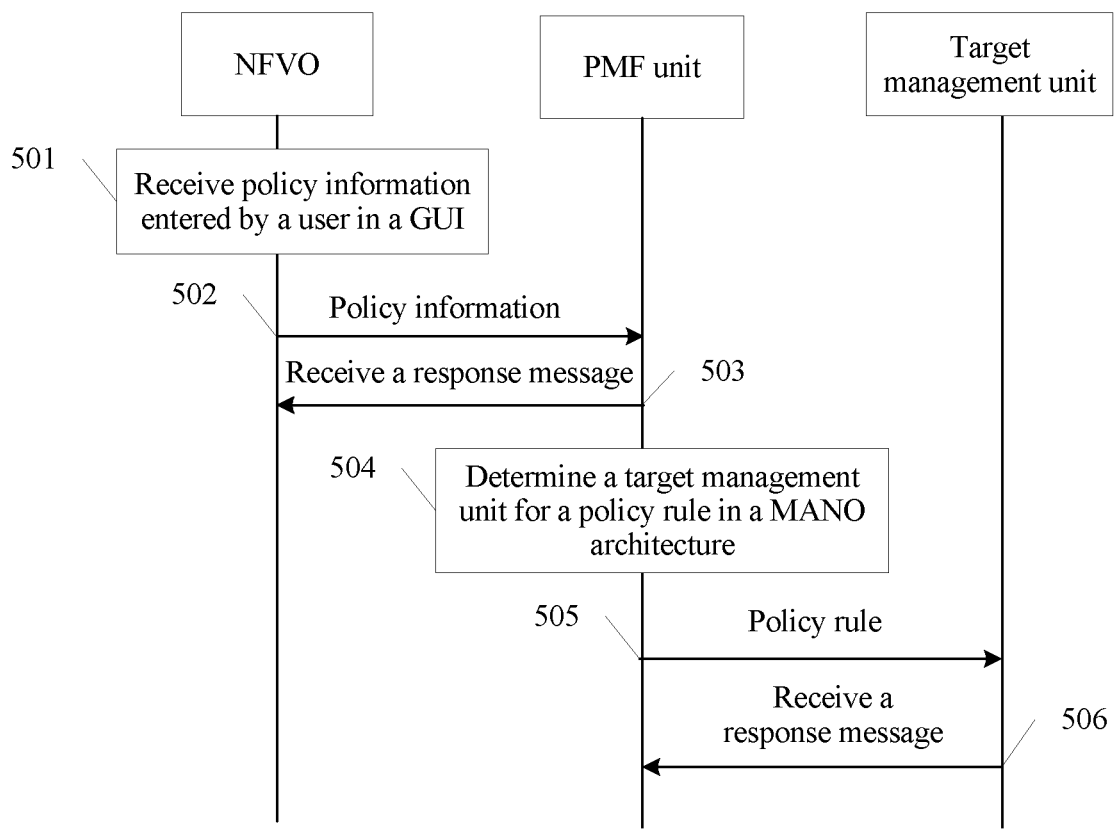
FIG. 5 is a schematic flowchart of a third policy transmission method in an NFV system according to an embodiment of the disclosure.

Referring to FIG. 5, FIG. 5 is a schematic diagram of a third policy transmission method in an NFV system according to an embodiment of the disclosure. In this embodiment, for details of the same content as the method shown in FIG. 3, refer to the first policy transmission method in an NFV system. The details are not described herein again. As shown in FIG. 5, the method, includes the following steps.

501. An NFVO receives policy information entered by a user in a GUI.

The policy information includes a policy rule and a first policy parameter. The first policy parameter is used to determine a target management unit for the policy rule in a MANO architecture of the NFV system.

502. The NFVO transmits the policy information to a PMF unit.

503. The PMF unit transmits a policy information reception response message to the NFVO.

It should be noted that steps 501, 502, and 503 are replaceable. For example, the method may alternatively include the following step:

The PMF unit receives policy information entered in a GUI. The policy information entered in the GUI may be policy information entered by a user in the GUI. Optionally, the GUI herein may be a GUI displayed on the PMF unit. Alternatively, the GUI may be a GUI displayed on the NFVO. To be specific, the policy information may be the policy information that is entered by the user in the GUI and that is received by the NFVO, and the NFVO transmits the policy information to the PMF unit.

504. The PMF unit uses the first policy parameter to determine a target, management unit for the policy rule in the MANO architecture.

The target management unit may be a policy execution unit for executing the policy rule.

Certainly, step 504 is optional. To be specific, in this embodiment, the PMF unit may directly transmit the policy rule to the target management unit when creating the policy information is complete.

505. The PMF unit transmits the policy rule to the target management unit.

For an implementation of step 505, refer to step 302 in the embodiment shown in FIG. 3. Details are not described herein again.

506. The target management unit transmits a policy rule reception response message to the PMF unit.

According to this embodiment, the NFVO can be prevented from becoming a policy rule processing bottleneck. In addition, the method described in this embodiment can be applied to the system shown in FIG. 1.

Figure 6:
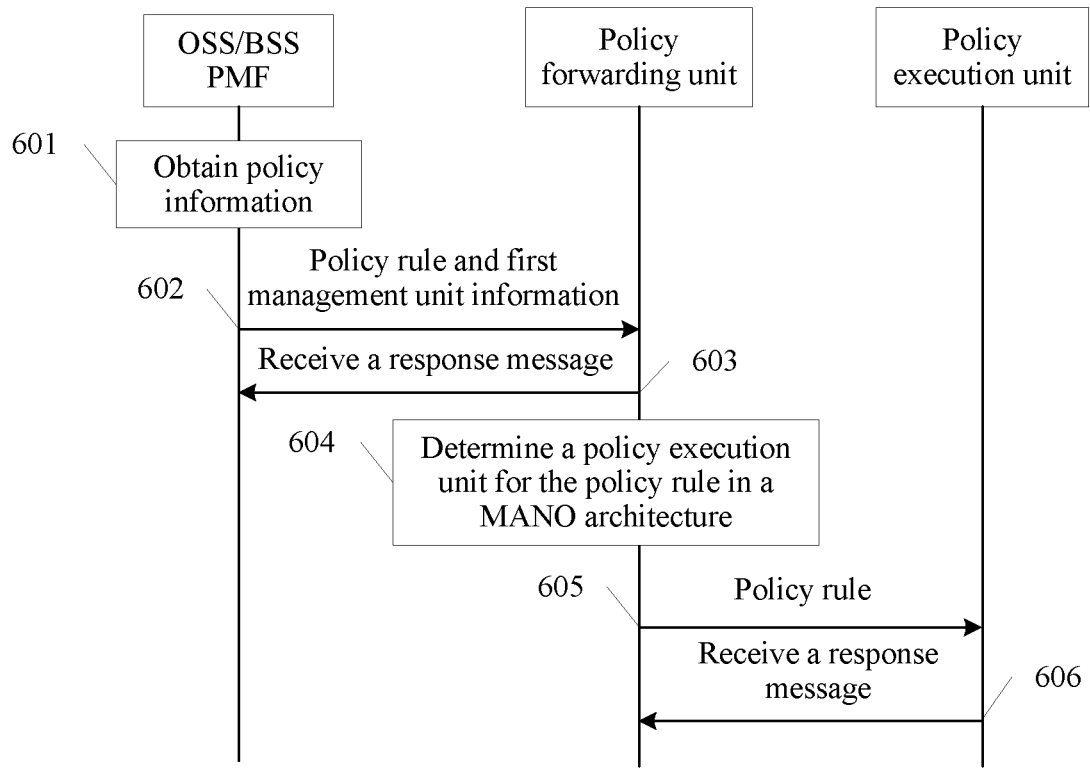
FIG. 6 is a schematic flowchart of a fourth policy transmission method in an NFV system according to an embodiment of the disclosure.

Referring to FIG. 6, FIG. 6 is a schematic diagram of a fourth policy transmission method in an NFV system according to an embodiment of the disclosure. In this embodiment, for details of the same content as the method shown in FIG. 3, refer to the first policy transmission method in an NFV system. The details are not described herein again. As shown in FIG. 6, the method includes the following steps.

601. A PMF unit obtains policy information.

The policy information includes a policy rule and a first policy parameter. The first policy parameter may include first management unit information of a policy execution unit for executing the policy rule and second management unit information of a policy forwarding unit. The first management unit information may include type information or identifier information of the policy execution unit. The second management unit information may include type information or identifier information of the policy forwarding unit. In addition, the policy forwarding unit may be a management unit in a MANO architecture. For example, the policy forwarding unit includes at least an NFVO.

602. The PMF unit uses the policy information to transmit the policy rule and first management unit information to a policy forwarding unit. Herein, it may be understood that the target management unit in the embodiment shown in FIG. 3 includes the policy forwarding unit.

Optionally, step 602 may include:

when the second management unit information includes the type information of the policy forwarding unit, selecting, by the PMF unit, the policy forwarding unit from a management unit set in the MANO architecture, and sending the policy rule and the first management unit information to the policy forwarding unit, so that the policy forwarding unit uses the first management unit information to send the policy rule to the policy execution unit, where a management unit type of a management unit included in the policy forwarding unit set is a management unit type indicated by the type information included in the second management unit information; or sending, by the PMF unit, the policy rule and the first management unit information to the policy forwarding unit when the second management unit information includes the identifier information of the policy forwarding unit, so that the policy forwarding unit uses the first management unit information to send the policy rule to the policy execution unit.

In this implementation, the PMF unit may select all or some management units in the policy forwarding unit set as the policy forwarding unit. When receiving the policy rule and the first management unit information, the policy forwarding unit can transmit the policy rule to the policy execution unit based on the first management unit information. For a specific transmission process, refer to the foregoing implementation in which the PMF unit uses management unit information of the policy execution unit to transmit the policy rule to the policy execution unit. Details are not described herein again.

In addition, in this implementation, the policy forwarding unit may include at least the NFVO, and the policy execution unit includes at least one of the following:

a VNFM and a VIM.

The type information of the policy forwarding unit may include NFVO information. The type information of the policy execution unit may include VNFM information and VIM information.

603. The policy forwarding unit transmits a policy rule reception response message to the PMF unit.

604. The policy forwarding unit uses the first management unit information in the first policy parameter to determine a policy execution unit for executing the policy rule in the MANO architecture.

605. The policy forwarding unit transmits the policy rule to the policy execution unit.

606. The policy execution unit transmits a policy rule reception response message to the policy forwarding unit.

According to this embodiment, the policy rule can be sent to the policy execution unit by the policy forwarding unit. Therefore, the PMF unit does not need to establish a connection with the policy execution unit. This can reduce overheads of the NFV system. In addition, the method described in this embodiment can be applied to the system shown in FIG. 2.

The following are apparatus embodiments of the disclosure. The apparatus embodiments of the disclosure are used to execute the methods implemented in method Embodiment 1 to Embodiment 4 of the disclosure. For ease of description, only a part related to the embodiments of the disclosure is shown. For unrevealed specific technical details, refer to Embodiment 1, Embodiment 2, Embodiment 3, and Embodiment 4 of the disclosure.

Figure 7:
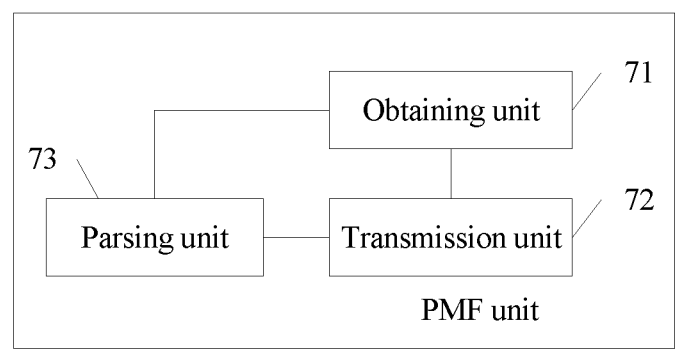
FIG. 7 is a schematic structural diagram of a PMF unit according to an embodiment of the disclosure.

Referring to FIG. 7, FIG. 7 is a schematic structural diagram of a PMF unit according to an embodiment of the disclosure. As shown in FIG. 7, the PMF unit includes: an obtaining unit 71 and a transmission unit 72.

The obtaining unit 71 is configured to obtain policy information, where the policy information includes a policy rule and a first policy parameter, and the first policy parameter is used to determine a target management unit for the policy rule in a MANO architecture of an NFV system.

The transmission unit 72 is configured to transmit the policy rule to the target management unit based on the first policy parameter.

Optionally, the target management unit may include at least one of the following:

an NFVO, a VNFM, and a VIM.

Optionally, the first policy parameter may include type information of a MANO function. In this implementation, the target management unit may include a management unit for implementing the MANO function.

The transmission unit 72 may be configured to determine, by using the type information, the management unit for implementing the MANO function in the MANO architecture, and transmit the policy rule to the management unit for implementing the MANO function.

Optionally, the type information of the MANO function may include at least one of the following:

virtualized network function life cycle management, network service life cycle management, network service healing, virtualized network function healing, and virtual resource management.

Optionally, the first policy parameter may include information about a policy execution unit for executing the policy rule. The information about the policy execution unit may include type information or identifier information of the policy execution unit. In this implementation, the target management unit may include the policy execution unit for executing the policy.

The transmission unit 72 may be configured to: when the information about the policy execution unit includes the type information of the policy execution unit, select the policy execution unit from an execution management unit set in the MANO architecture, and send the policy rule to the policy execution unit, where a management unit type of a management unit included in the execution management unit set is a management unit type indicated by the type information; or the transmission unit 72 may be configured to: when the information about the policy execution unit includes management unit identifier information of the policy execution, use the management unit identifier information to identify the policy execution unit, and send the policy rule to the policy execution unit.

Optionally, the type information of the policy execution unit may include:

NFVO information, VNFM information, or VIM information.

Optionally, the first policy parameter may include first management unit information of a policy execution unit for executing the policy rule and second management unit information of a policy forwarding unit. The first management unit information may include type information or identifier information of the policy execution unit. The second management unit information may include type information or identifier information of the policy forwarding unit.

In this implementation, the target management unit may include the policy forwarding unit.

Optionally, the transmission unit 72 may be configured to: when the second management unit information includes the type information of the policy forwarding unit, select the policy forwarding unit from a management unit set in the MANO architecture, and send the policy rule and the first management unit information to the policy forwarding unit, so that the policy forwarding unit uses the first management unit information to send the policy rule to the policy execution unit, where a management unit type of a management unit included in the policy forwarding unit set is a management unit type indicated by the type information included in the second management unit information; or the transmission unit 72 may be configured to send the policy rule and the first management unit information to the policy forwarding unit when the second management unit information includes the identifier information of the policy forwarding unit, so that the policy forwarding unit uses the first management unit information to send the policy rule to the policy execution unit.

In this implementation, the policy forwarding unit may include at least the NFVO, and the policy execution unit may include at least one of the following:

the VNFM and the VIM.

Optionally, the policy information may further include a second policy parameter. The second policy parameter is used to indicate that the policy rule is an atomic policy rule. The atomic policy rule is a policy rule that does not need to be further parsed when being executed.

The transmission unit 72 may be configured to transmit the atomic policy rule to the target management unit based on the first policy parameter.

Optionally, the policy information may further include a second policy parameter. The second policy parameter may be used to indicate that the policy rule is a composite policy rule. The composite policy rule includes at least two atomic policy rules. The atomic policy rule is a policy rule that does not need to be further parsed when being executed.

Optionally, the PMF unit may further include:

a parsing unit 73, configured to: when the second policy parameter indicates that the policy rule is a composite policy rule, parse the policy rule to obtain the at least two atomic policy rules included in the policy rule.

The transmission unit 72 may be configured to transmit, based on the first policy parameter, the at least two atomic policy rules included in the policy rule to the target management unit.

Optionally, the obtaining unit 71 may be configured to receive a policy rule creation command transmitted by an OSS or a BSS, and use the policy rule creation command to create policy information; or the obtaining unit 71 is configured to receive policy information entered in a GUI.

It should be noted that the PMF unit provided in this embodiment may be the PMF unit in the embodiments shown in FIG. 1 to FIG. 6. All implementations of the PMF unit in the embodiments shown in FIG. 1 to FIG. 6 can be implemented by the PMF unit provided in this embodiment. Details are not described herein again.

Figure 8:
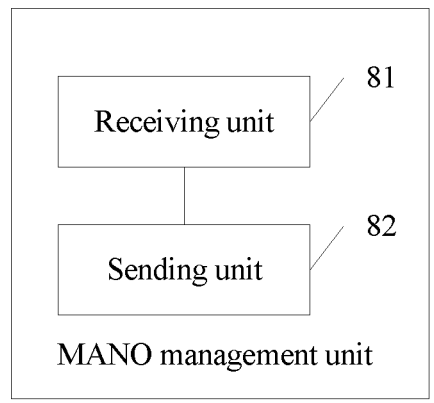
FIG. 8 is a schematic structural diagram, of a MANO management unit according to an embodiment of the disclosure.

Referring to FIG. 8, FIG. 8 is a schematic structural diagram of a MANO management unit according to an embodiment of the disclosure. The MANO management unit may be a management unit in a MANO architecture, for example, a logical management unit in the MANO architecture or a physical management unit in the MANO architecture. Alternatively, the MANO management unit may be the target management unit in the embodiments shown in FIG. 3 to FIG. 7. This embodiment is described by using an example in which the MANO management unit is the target management unit. As shown in FIG. 8, the MANO management unit includes a receiving unit 81.

The receiving unit 81 is configured to receive a policy rule transmitted by a PMF unit, where the policy rule is transmitted by the PMF unit by using a first policy parameter, the first policy parameter and the policy rule are included in policy information obtained by the PMF unit, and the first policy parameter is used to determine a target management unit for the policy rule in a MANO architecture of an NFV system.

Optionally, the target management unit includes at least one of the following:

an NFVO, a VNFM, and a VIM.

Alternatively, the target management unit may be a management unit for implementing a MANO function. The MANO function is a MANO function indicated, by type information of the MANO function that is included in the first policy parameter. The MANO function includes at least one of the following:

virtualized network function life cycle management, network service life cycle management, network service healing, virtualized network function healing, and virtual resource management.

Alternatively, the target management unit may be a policy execution unit for executing the policy rule.

Alternatively, the target management unit may be a policy forwarding unit. The receiving unit 81 may be configured to receive the policy rule and first management unit information that are sent by the PMF unit. The first management unit information includes type information or identifier information of the policy execution unit.

In this implementation, the target management unit may further include:

a sending unit 82, configured to use the first management unit information to send the policy rule to the policy execution unit.

Optionally, the receiving unit 81 may be configured to receive an atomic policy rule transmitted by the PMF unit. The atomic policy rule is a policy rule that does not need to be further parsed when being executed. The atomic policy rule may be an atomic policy rule indicated by a second policy parameter obtained by the PMF unit, or the atomic policy rule may be an atomic policy rule obtained by the PMF unit by parsing a composite policy rule indicated by a second policy parameter. The composite policy rule includes at least two atomic policy rules.

It should be noted that the MANO management unit provided in this embodiment may be the target management unit in the embodiments shown in FIG. 1 to FIG. 6. All implementations of the target management unit in the embodiments shown in FIG. 1 to FIG. 6 can be implemented by the MANO management unit provided in this embodiment. Details are not described herein again.

Figure 9:
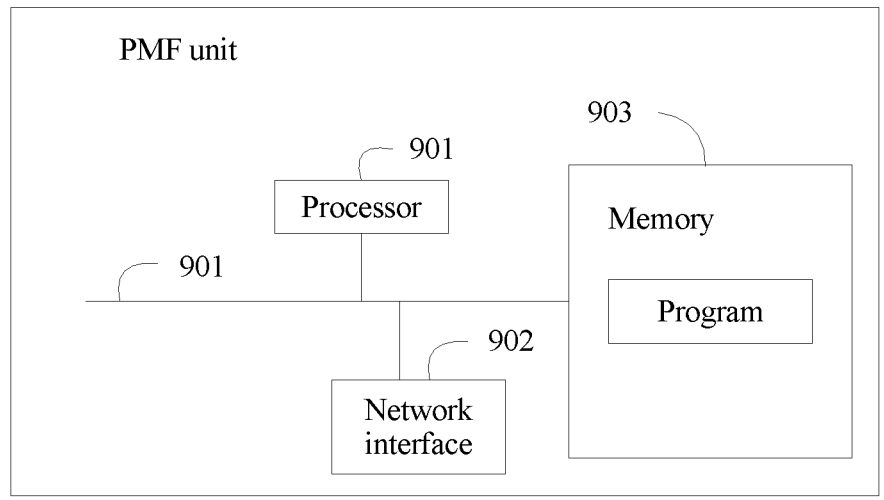
FIG. 9 is a schematic structural diagram of another PMF unit according to an embodiment of the disclosure.

Referring to FIG. 9, FIG. 9 is a schematic structural diagram of another PMF unit according to an embodiment of the disclosure. As shown in FIG. 9, the PMF unit, includes: a processor 901, a network interface 902, a memory 903, and a communications bus 904. The communications bus 904 is configured to implement connection and communication between, the processor 901, the network interface 902, and the memory 903. The network interface 902 may be configured to transmit a policy rule and receive policy information. The processor 901 executes a program stored in the memory 903, to implement the following method:

obtaining policy information, where the policy information includes a policy rule and a first policy parameter, and the first policy parameter is used to determine a target management unit for the policy rule in a MANO architecture of an NFV system; and transmitting the policy rule to the target management unit based on the first policy parameter.

Optionally, the target management unit may include at least one of the following:

an NFVO, a VNFM, and a VIM.

Optionally, the first policy parameter may include function type information of a MANO function. The target, management unit includes a management unit for implementing the MANO function.

The step executed by the processor 901 of transmitting the policy rule to the target management unit based on the first policy parameter may include:

determining, by using the type information, the management unit for implementing the MANO function in the MANO architecture, and transmitting the policy rule to the management unit for implementing the MANO function.

Optionally, the type information of the MANO function may include at least one of the following:

virtualized network function life cycle management, network service life cycle management, network service healing, virtualized network function healing, and virtual resource management.

Optionally, the first policy parameter includes information about a policy execution unit for executing the policy rule. The information about the policy execution unit includes type information or identifier information of the policy execution unit.

The step executed by the processor 901 of transmitting the policy rule to the target management unit based on the first policy parameter may include:

when the information about the policy execution unit includes the type information of the policy execution unit, selecting the policy execution unit from an execution management unit set in the MANO architecture, and sending the policy rule to the policy execution unit, where a management unit type of a management unit included in the execution management unit set is a management unit type indicated by the type information; or when the information about the policy execution unit includes the identifier information of the policy execution unit, using the identifier information to identify the policy execution unit, and sending the policy rule to the policy execution unit.

Optionally, the type information of the management unit may include:

NFVO information, VNFM information, or VIM information.

Optionally, the first policy parameter may include first management unit information of a policy execution unit for executing the policy rule and second management unit information of a policy forwarding unit. The first management unit information may include type information or identifier information of the policy execution unit. The second management unit information may include type information or identifier information of the policy forwarding unit.

Optionally, in this implementation, the step executed by the processor 901 of transmitting the policy rule to the target management unit based on the first policy parameter may include:

when the second management unit information includes the type information of the policy forwarding unit, selecting the policy forwarding unit from a management unit set in the MANO architecture, and sending the policy rule and the first management unit information to the policy forwarding unit, so that the policy forwarding unit uses the first management unit information to send the policy rule to the policy execution unit, where a management unit type of a management unit included in the policy forwarding unit set is a management unit type indicated by the type information included in the second management unit information; or sending the policy rule and the first management unit information to the policy forwarding unit when the second management unit information includes the identifier information of the policy forwarding unit, so that the policy forwarding unit uses the first management unit information to send the policy rule to the policy execution unit.

Optionally, the policy forwarding unit may include at least the NFVO, and the policy execution unit may include at least one of the following:

the VNFM and the VIM.

Optionally, the policy information may further include a second policy parameter. The second policy parameter is used to indicate that the policy rule is an atomic policy rule. The atomic policy rule is a policy rule that does not need to be further parsed while being executed.

The step executed by the processor 901 of transmitting the policy rule to the target management unit based on the first policy parameter may include:

transmitting the atomic policy rule to the target management unit based on the first policy parameter.

Optionally, the policy information may further include a second policy parameter. The second policy parameter may be used to indicate that the policy rule is a composite policy rule. The composite policy rule includes at least two atomic policy rules. The atomic policy rule is a policy rule that does not need to be further parsed when being executed.

The processor 901 may further execute the following step:

when the second policy parameter indicates that the policy rule is a composite policy rule, parsing the policy rule to obtain the at least two atomic policy rules included in the policy rule.

The step executed by the processor 901 of transmitting the policy rule to the target management unit based on the first policy parameter may include:

transmitting, based on the first policy parameter, the at least two atomic policy rules included in the policy rule to the target management unit.

Optionally, the program, executed by the processor 901 to obtain the policy information may include:

receiving a policy rule creation command transmitted by an OSS or a BSS, and using the policy rule creation command to create policy information; or receiving policy information entered in a GUI.

In this embodiment, the MANO architecture may include the PMF unit; or the PMF unit may be located in the OSS or the BSS.

In this embodiment, the PMF unit is responsible for transmitting the policy rule in the MANO architecture. This can reduce load of the NFVO in the MANO architecture, thereby preventing the NFVO from becoming a policy rule processing bottleneck.

Figure 10:
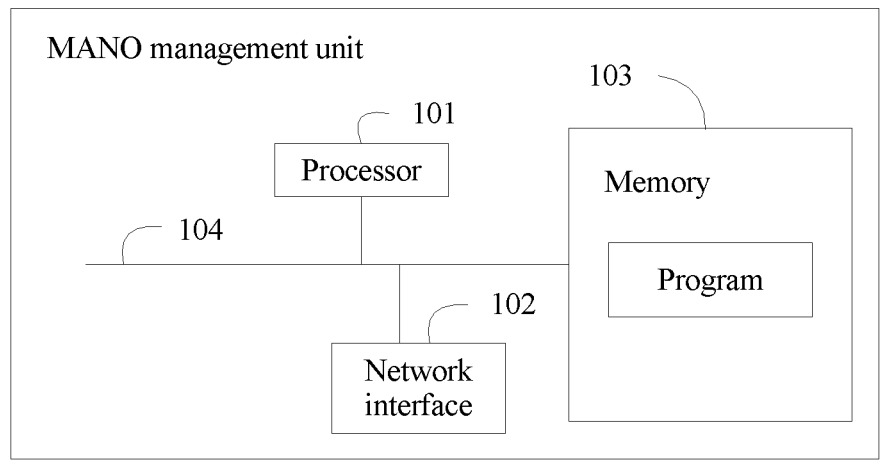
FIG. 10 is a schematic structural diagram of another MANO management unit according to an embodiment of the disclosure.

Referring to FIG. 10, FIG. 10 is a schematic structural diagram of another MANO management unit according to an embodiment of the disclosure. The MANO management unit may be a management unit in a MANO architecture, for example, a logical management unit in the MANO architecture or a physical management unit in the MANO architecture. Alternatively, the MANO management unit may be the target management unit in the embodiments shown in FIG. 3 to FIG. 7. This embodiment is described by using an example in which the MANO management unit is the target management unit. As shown in FIG. 10, the MANO management unit includes: a processor 101, a network interface 102, a memory 103, and a communications bus 104. The communications bus 104 is configured to implement connection and communication between the processor 101, the network interface 102, and the memory 103. The network interface 102 may be configured to transmit a policy rule. The processor 101 executes a program stored in the memory 103, to implement the following method:

receiving a policy rule transmitted by a PMF unit, where the policy rule is transmitted by the PMF unit by using a first policy parameter, the first policy parameter and the policy rule are included in policy information obtained by the PMF unit, and the first policy parameter is used to determine a target management unit for the policy rule in a MANO architecture of an NFV system.

Optionally, the target management unit includes at least one of the following:

an NFVO, a VNFM, and a VIM.

Alternatively, the target management unit may be a management unit for implementing a MANO function. The MANO function is a MANO function indicated by type information of the MANO function that is included in the first policy parameter. The MANO function includes at least one of the following:

virtualized network function life cycle management, network service life cycle management, network service healing, virtualized network function healing, and virtual resource management.

Alternatively, the target management unit may be a policy execution unit for executing the policy rule.

Alternatively, the target management unit may be a policy forwarding unit. The step executed by the processor 101 of receiving a policy rule sent by a PMF unit may include:

receiving the policy rule and first management unit information that are sent by the PMF unit, where the first management unit information includes type information or identifier information of the policy execution unit.

In this implementation, the processor 101 may further execute the following step:

using the first management unit, information to send the policy rule to the policy execution unit.

Optionally, the step executed by the processor 101 of receiving a policy rule sent by a PMF unit may include:

receiving an atomic policy rule transmitted by the PMF unit. The atomic policy rule is a policy rule that does not need to be further parsed when being executed. The atomic policy rule may be an atomic policy rule indicated by a second policy parameter obtained by the PMF unit, or the atomic policy rule may be an atomic policy rule obtained by the PMF unit by parsing a composite policy rule indicated by a second policy parameter. The composite policy rule includes at least two atomic policy rules.

It should be noted that the MANO management unit provided in this embodiment may be the target management unit in the embodiments shown in FIG. 1 to FIG. 6. All implementations of the target management unit in the embodiments shown in FIG. 1 to FIG. 6 can be implemented by the MANO management unit provided, in this embodiment. Details are not described herein again.

In this embodiment, the PMF unit is responsible for transmitting the policy rule in the MANO architecture. This can reduce load of the NFVO in the MANO architecture, thereby preventing the NFVO from becoming a policy rule processing bottleneck.

In the embodiments of this application, the management unit, the policy execution unit, and the policy forwarding unit may be entities or may be functional units. The entity may be a logical entity or a physical entity, and details are not described herein.

A person of ordinary skill in the art may understand that all or some of the processes of the methods in the embodiments may be implemented by a computer program instructing relevant hardware. The program, may be stored in a computer readable storage medium. When the program runs, the processes of the methods in the embodiments are performed. The foregoing storage medium may be a magnetic disc, an optical, disc, a read-only memory (ROM), a random access memory (RAM for short), or the like.

What are disclosed above are merely examples of embodiments of the disclosure, and certainly are not intended to limit the scope of the claims of the disclosure.

Therefore, equivalent variations made in accordance with the claims of the disclosure shall fall within the scope of the disclosure.

What is claimed is:

1. A policy transmission method in a Network Functions virtualization (NFV) system, the method comprising:
obtaining, by a policy management function (PMF) unit, policy information comprising a policy rule and a first policy parameter, and the first policy parameter is used to determine a target management unit for the policy rule in a management and orchestration (MANO) architecture of the NFV system, wherein the first policy parameter comprises information about a policy execution unit for executing the policy rule, and wherein the information about the policy execution unit comprises identifier information of the policy execution unit; and
transmitting, by the PMF unit, the policy rule to the target management unit based on the first policy parameter, wherein the target management unit comprises the policy execution unit for executing the policy rule, and wherein transmitting, by the PMF unit, the policy rule to the target management unit based on the first policy parameter comprises:
identifying, by the PMF unit, the policy execution unit based on the identifier information of the policy execution unit; and
sending the policy rule to the policy execution unit.

2. The method according to claim 1, wherein the target management unit comprises at least one of the following:
a network functions virtualization orchestrator (NFVO), a virtualized network function manager (VNFM), or a virtualized infrastructure manager (VIM).

3. The method according to claim 1, wherein:
the first policy parameter comprises type information of a MANO function;
the target management unit comprises a management unit for implementing the MANO function; and
transmitting, by the PMF unit, the policy rule to the target management unit based on the first policy parameter comprises:
determining, by the PMF unit by using the type information, the management unit for implementing the MANO function in the MANO architecture, and transmitting the policy rule to the management unit for implementing the MANO function.

4. The method according to claim 3, wherein the type information of the MANO function comprises at least one of the following:
virtualized network function life cycle management, network service life cycle management, network service healing, virtualized network function healing, or virtual resource management.

5. The method according to claim 1, wherein:
the information about the policy execution unit comprises type information of the policy execution unit; and
transmitting, by the PMF unit, the policy rule to the target management unit based on the first policy parameter comprises:
selecting, by the PMF unit, the policy execution unit from an execution management unit set in the MANO architecture, and sending the policy rule to the policy execution unit, wherein a management unit type of a management unit comprised in the execution management unit type set is management unit type indicated by the type information.

6. The method according to claim 5, wherein the type information of the policy execution unit comprises at least one of: NFVO information, VNFM information, or VIM information.

7. The method according to claim 1, wherein:
the first policy parameter comprises first management unit information of a policy execution unit for executing the policy rule and second management unit information of a policy forwarding unit, and the first management unit information comprises type information or identifier information of the policy execution unit; and the second management unit information comprises type information or identifier information of the policy forwarding unit.

8. The method according to claim 7, wherein the policy forwarding unit comprises at least the NFVO, and the policy execution unit comprises at least one of the following:
the VNFM or the VIM.

9. The method according to claim 1, wherein:
the policy information further comprises a second policy parameter used to indicate that the policy rule is an atomic policy rule, and the atomic policy rule is a policy rule that does not need to be further parsed when being executed; and
transmitting, by the PMF unit, the policy rule to the target management unit based on the first policy parameter comprises:
transmitting, by the PMF unit, the atomic policy rule to the target management unit based on the first policy parameter.

10. The method according to claim 1, wherein:
the policy information further comprises a second policy parameter used to indicate that the policy rule is a composite policy rule, the composite policy rule comprises at least two atomic policy rules, and the atomic policy rule a policy rule that does not need to be further parsed when being executed;
the method further comprises:
when the second policy parameter indicates that the policy rule is a composite policy rule, parsing, by the PMF unit, the policy rule to obtain the at least two atomic policy rules comprised in the policy rule; and
transmitting, by the PMF unit, the policy rule to the target management unit based on the first policy parameter comprises:
transmitting, by the PMF unit based on the first policy parameter, the at least two atomic policy rules comprised in the policy rule to the target management unit.

11. A policy management function (PMF) unit, comprising:
a network interface; and
at least one processor configured to:
obtain policy information through the network interface, wherein the policy information comprises a policy rule and a first policy parameter, and the first policy parameter is used to determine a target management unit for the policy rule in a management and orchestration (MANO) architecture of an Network Functions virtualization (NFV) system, wherein the first policy parameter comprises information about a policy execution unit for executing the policy rule, and wherein the information about the policy execution unit comprises identifier information of the policy execution unit, and
transmit, through the network interface, the policy rule to the target management unit based on the first policy parameter, wherein the target management unit comprises the policy execution unit for executing the policy rule, and wherein transmitting, through the network interface, the policy rule to the target management unit based on the first policy parameter comprises:

identify the policy execution unit based on the identifier information of the policy execution unit; and sending the policy rule to the policy execution unit through the network interface.

12. The PMF unit according to claim 11, wherein:
the first policy parameter comprises type information of a MANO function; and
the at least one processor is further configured to:
determine, by using the type information, a management unit for implementing the MANO function in the MANO architecture, and
transmit, through the network interface, the policy rule to the management unit for implementing the MANO function.

13. The PMF unit according to claim 12, wherein the type information of the MANO function comprises at least one of the following:
Virtualized network function life cycle management, network service life cycle management, network service healing, virtualized network function healing, or virtual resource management.

14. The PMF unit according to claim 11, wherein:
the information about the policy execution unit comprises type information of the policy execution unit; and
the at least one processor is further configured to:
select the policy execution unit from an execution management unit set in the MANO architecture; and, the processor is configured to send the policy rule to the policy execution unit through the network interface, wherein a management unit type of a management unit comprised in the execution management unit set is a management unit type indicated by the type information.

15. The PMF unit according to claim 14, wherein the type information of the policy execution unit comprises at least one of:
NFVO information, VNFM information, or VIM information.

16. The PMF unit according to claim 11, wherein:
The first policy parameter comprises first management unit information of a policy execution unit for executing the policy rule and second management unit information of a policy forwarding unit, the first management unit information comprises type information or identifier information of the policy execution unit; and
The second management unit information comprises type information or identifier information of the policy forwarding unit.

17. The PMF unit according to claim 11, wherein:
the policy information further comprises a second policy parameter used to indicate that the policy rule is an atomic policy rule, and the atomic policy rule is a policy rule that does not need to be further parsed when being executed; and
the at least one processor is configured to transmit, through the network interface, the atomic policy rule to the target management unit based on the first policy parameter.

18. The PMF unit according to claim 11, wherein:
the policy information further comprises a second policy parameter used to indicate that the policy rule is a composite policy rule, the composite policy rule comprises at least two atomic policy rules, and the atomic policy rule is a policy rule that does not need to be further parsed when being executed; and
the at least one processor is further configured to:
when the second policy parameter indicates that the policy rule is a composite policy rule, parse the policy rule to obtain the at least wo atomic policy rules comprised in the policy rule, and
transmit, through the network interface, based on the first policy parameter, the at least two atomic policy rules comprised in the policy rule to the target management unit.

19. The PMF unit according to claim 11, wherein the at least one processor is further configured to:
receive, through the network interface, a policy rule creation command transmitted by an operations support system (OSS) or a business support system (BSS), and use the policy rule creation command to create policy information; or
receive policy information entered in a graphical user interface (GUI).

20. A non-transitory computer-readable medium storing instructions which, when executed by one or more processor, cause a computer to:
obtain policy information comprising a policy rule and a first policy parameter, and the first policy parameter is used to determine a target management unit for the policy rule in a management and orchestration (MANO) architecture of a Network Functions Virtualization (NFV) system, wherein the first policy parameter comprises information about a policy execution unit for executing the policy rule, and wherein the information about the policy execution unit comprises identifier information of the policy execution unit; and
transmit the policy rule to the target management unit based on the first policy parameter, wherein the target management unit comprises the policy execution unit for executing the policy rule, and
wherein transmitting the policy rule to the target management unit based on the first policy parameter comprises:
identify the policy execution unit based on the identifier information of the policy execution unit; and
sending the policy rule to the policy execution unit.

* * * * *